United States Patent
Ideshio et al.

(10) Patent No.: US 8,424,622 B2
(45) Date of Patent: Apr. 23, 2013

(54) HYBRID DRIVE UNIT

(75) Inventors: Yukihiko Ideshio, Susono (JP); Hideaki Komada, Susono (JP); Yoshihiro Iijima, Toyota (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 831 days.

(21) Appl. No.: 12/519,598

(22) PCT Filed: Dec. 17, 2007

(86) PCT No.: PCT/JP2007/074613
§ 371 (c)(1), (2), (4) Date: Jun. 17, 2009

(87) PCT Pub. No.: WO2008/075760
PCT Pub. Date: Jun. 26, 2008

(65) Prior Publication Data
US 2010/0032218 A1 Feb. 11, 2010

(30) Foreign Application Priority Data
Dec. 18, 2006 (JP) .................. 2006-340204

(51) Int. Cl.
*B60K 6/445* (2007.10)
(52) U.S. Cl.
USPC .............. 180/65.225; 180/65.235; 180/65.7
(58) Field of Classification Search ............ 180/65.235, 180/65.7; 475/5
See application file for complete search history.

(56) References Cited

U.S. PATENT DOCUMENTS

| | | | |
|---|---|---|---|
| 2005/0137042 A1* | 6/2005 | Schmidt et al. | 475/5 |
| 2005/0221939 A1* | 10/2005 | Takami et al. | 475/5 |
| 2005/0288147 A1* | 12/2005 | Endo et al. | 477/5 |
| 2006/0240929 A1* | 10/2006 | Raghavan et al. | 475/5 |

FOREIGN PATENT DOCUMENTS

| | | |
|---|---|---|
| JP | 11 227476 | 8/1999 |
| JP | 2004 345527 | 12/2004 |
| JP | 2005 9514 | 1/2005 |
| JP | 2005 67319 | 3/2005 |
| JP | 3651469 B2 * | 5/2005 |
| JP | 2006 258140 | 9/2006 |

* cited by examiner

*Primary Examiner* — Hau Phan
*Assistant Examiner* — Bryan Evans
(74) *Attorney, Agent, or Firm* — Oblon, Spivak, McClelland, Maier & Neustadt, L.L.P.

(57) ABSTRACT

A hybrid drive unit includes a power distribution mechanism for distributing a power from an engine to a first electric motor and to an output shaft; a transmission, which is arranged between the output shaft and a second electric motor in a manner to transmit a torque therebetween, and which is capable of setting an overdrive ratio where a speed of the output shaft is higher than that of a predetermined input element; and an engagement mechanism for connecting the engine selectively with the input element of the transmission, and for setting a speed change ratio of the transmission to the overdrive ratio. The hybrid drive unit is capable of setting an overdrive mode and is easy to be downsized.

2 Claims, 6 Drawing Sheets

HYBRID DRIVE UNIT

TECHNICAL FIELD

This invention relates to a hybrid drive unit having a plurality of power units as power sources for running a vehicle. More particularly, this invention relates to a hybrid drive unit capable of setting a drive mode where a power outputted from an internal combustion engine is distributed to a first electric motor and to an output member, and a drive mode where the internal combustion engine is mechanically connected with the output member and a speed change ratio is fixed to an overdrive ratio.

BACKGROUND ART

As well known in the art, a hybrid drive unit comprises an electric motor or a motor generator as an extra power source in addition to an internal combustion engine. Therefore, the hybrid drive unit is capable of reducing emission from the internal combustion engine and improving fuel economy, by driving the internal combustion engine as efficiently as possible, while adjusting excess and deficiency of output torque and engine braking force by the electric motor or the motor generator, and regenerating energy during deceleration. According to the drive unit of this kind, the electric motor capable of functioning as a generator being connected with a power distribution mechanism generates electric power when an output speed is relatively low. The electric power generated by the electric motor is supplied to another electric motor thereby operating said another electric motor as a motor, and a power of said another electric motor is added to an output member. To the contrary, in case the output speed is raised to relatively high speed, the electric motor connected with the power distribution mechanism is used as a motor by rotating the electric motor in a direction opposite to a rotational direction of the internal combustion engine. The output of the electric motor being rotated as a motor is used to rotate said another electric motor thereby operating said another electric motor as a generator. That is, the output of the electric motor functioning as a motor is converted into an electric power by said another electric motor functioning as a generator, and the converted electric power is returned to the electric motor of an input side to be converted into a mechanical power again and transmitted to an output side. Thus, the output of the electric motor is converted between mechanical power and electric power, and such power circulation induces undesirable energy losses. As a result, transmission efficiency is deteriorated and fuel economy of hybrid vehicle is thereby degraded.

In order to solve the problem explained above, conventional hybrid drive unit have been adapted to set at least two drive modes by varying a substantial speed change ratio between an internal combustion engine and an output member. One example of such hybrid drive unit is disclosed in Japanese Patent Laid-Open No. 2004-345527. According to the teachings of Japanese Patent Laid-Open No. 2004-345527, the driving device of hybrid car comprises a first motor generator arranged coaxially with a rotational center of an engine, a single pinion type planetary gear mechanism, a double pinion type planetary gear mechanism, and a second motor generator. The engine and the first motor generator are connected through the single pinion type planetary gear mechanism functioning as a power distribution mechanism. A carrier of the single pinion type planetary gear mechanism is connected with a ring gear of the double pinion type planetary gear mechanism, and a ring gear of the single pinion type planetary gear mechanism is connected with a carrier of the double pinion type planetary gear mechanism. The ring gear of the single pinion type planetary gear mechanism and the carrier of the double pinion type planetary gear mechanism are connected with the output member and the second motor generator. This driving device of hybrid car further comprises a brake for halting a sun gear of the double pinion type planetary gear mechanism.

Therefore, according to the driving device of hybrid car taught by Japanese Patent Laid-Open No. 2004-345527, a normal mode, in which an output torque of the engine and a torque of the first motor generator synthesized or distributed by the single pinion type planetary gear mechanism is/are outputted to the output member, and in which an engine speed is controlled by the first motor generator, is set in case the brake is being released. To the contrary, in case the sun gear of the double pinion type planetary gear mechanism is halted by engaging the brake, the double pinion type planetary gear mechanism functions as a speed increasing mechanism in which the output element is rotated at high speed using the sun gear as a fixing element, ring gear as an input element and carrier as an output element. As a result, the engine speed can be lowered relatively even if the output speed is high. On the other hand, Japanese Patent Laid-Open No. 2005-9514 discloses a control system fixing a planetary mechanism to which an engine and a first motor generator are connected to function as a speed increasing mechanism.

According to the teachings of Japanese Patent Laid-Opens Nos. 2004-345527 and 2005-9514, power of the engine is distributed to the output member such as an output shaft by two sets of the planetary gear mechanisms or complex planetary gear mechanisms, and a drive mode in which the power is transmitted to the output member while converting the power and a drive mode in which the power is transmitted to the output member mechanically are set by engaging or releasing the brake. Thus, the power distribution mechanism is substantially composed of a plurality of planetary gear mechanisms, and a quantity of planetary gear mechanisms are therefore required to form the hybrid drive unit. For this reason, size of those hybrid drive unit have to be enlarged and mountability of those hybrid drive units on a vehicle is thereby degraded.

DISCLOSURE OF THE INVENTION

The present invention has been conceived noting the technical problems thus far described, and its object is to provide a hybrid drive unit capable of setting an overdrive mode utilizing existing mechanisms to downsize the hybrid drive unit.

In order to achieve the above-mentioned object, according to the present invention, there is provided a hybrid drive unit, comprising: a power distribution mechanism for distributing a power outputted from an internal combustion engine to a first electric motor and to an output member; and a transmission, which is arranged between the output member and a second electric motor in a manner to transmit a torque therebetween, and which is capable of setting an overdrive ratio in which a speed of the output member is higher than that of a predetermined input element, characterized by further comprising: an engagement mechanism for connecting the internal combustion engine selectively with the input element of the transmission, and for setting a speed change ratio of the transmission to the overdrive ratio.

The transmission comprises two sets of planetary gear mechanism such as first and second planetary gear mechanisms, and any of rotary elements of the first planetary gear mechanism is connected with any of rotary elements of the second planetary gear mechanism.

The first planetary gear mechanism is a double pinion type planetary gear mechanism comprising a first sun gear as an external gear, a first ring gear as an internal gear which is arranged concentrically with the first sun gear, and a first carrier holding a pinion gear meshing with the first sun gear and another pinion gear meshing with the pinion gear and the first ring gear. On the other hand, the second planetary gear mechanism is a single pinion type planetary gear mechanism comprising a second sun gear as an external gear, a second ring gear as an internal gear which is arranged concentrically with the second sun gear, and a second carrier holding a pinion gear meshing with the second sun gear and the second ring gear.

The first planetary gear mechanism and the second planetary gear mechanism are arranged coaxially in tandem, and only a connection member connecting the ring gears of the planetary gear mechanisms while connecting those ring gears with the output member is situated outer circumferential side of the planetary gear mechanisms.

The first carrier and the second sun gear are connected to rotate integrally, and the first sun gear is connected with the second electric motor. The aforementioned engagement mechanism includes a first clutch mechanism selectively connecting the second carrier with the internal combustion engine, and a first brake mechanism selectively halting the first carrier and the second sun gear. In addition, there is provided a second brake mechanism selectively halting the second carrier.

The first sun gear and the second sun gear are connected with each other to share a common axis.

Alternatively, according to the present invention, the first carrier is connected with the second electric motor. In this case, the aforementioned engagement mechanism includes a second clutch mechanism selectively connecting the second carrier with the internal combustion engine, and a third brake mechanism selectively halting the first sun gear and the second sun gear. In addition, there is provided a fourth brake mechanism selectively halting the second carrier.

Alternatively, according to the present invention, the first planetary gear mechanism and the second planetary gear mechanism are arranged in tandem and coaxially with the second electric motor. The hybrid drive unit of this example further comprises a fifth brake mechanism for setting the overdrive ratio by halting any of the rotary elements of those planetary gear mechanisms, and a sixth brake mechanism for setting a speed change ratio larger than the overdrive ratio by halting another rotary element. In this case, the fifth and the sixth brake mechanisms are arranged between the second electric motor and the planetary gear mechanisms.

Alternatively, according to the present invention, the first carrier and the second sun gear are connected to rotate integrally, the first ring gear and the second carrier are connected to rotate integrally, the first sun gear is connected with the second electric motor, and the second ring gear is connected with the output member. In this case, the aforementioned engagement mechanism includes a third clutch mechanism selectively connecting the first ring gear and the second carrier with the internal combustion engine, and the fifth brake mechanism selectively halting the first carrier and the second sun gear. In addition, there is provided the sixth brake mechanism selectively halting the first ring gear and the second carrier.

In addition to above, the hybrid drive unit further comprises a seventh brake mechanism selectively halting the first ring gear and the second carrier, and the seventh brake mechanism is situated outer circumferential side of the second planetary gear mechanism.

In addition to above, the first ring gear and the second carrier are connected to rotate integrally, the first carrier and the second sun gear are connected to rotate integrally, the first sun gear is connected with the second electric motor, and the second ring gear is connected with the output member. In this case, the aforementioned engagement mechanism includes an eighth brake mechanism selectively halting the first carrier and the second sun gear, and the fourth clutch mechanism selectively connecting the first ring gear and the second carrier with the internal combustion engine.

Alternatively, according to the present invention, the first planetary gear mechanism is a double pinion type planetary gear mechanism comprising a first sun gear as an external gear, a first ring gear as an internal gear which is arranged concentrically with the first sun gear, and a first carrier holding a pinion gear meshing with the first sun gear and another pinion gear meshing with the pinion gear and the first ring gear. On the other hand, the second planetary gear mechanism is a single pinion type planetary gear mechanism comprising a third sun gear as an external gear, a third ring gear as an internal gear which is arranged concentrically with the third sun gear, and a third carrier holding a pinion gear meshing with the third sun gear and another pinion gear meshing with the pinion gear and the third ring gear. In the hybrid drive unit of this case, the first carrier and the third ring gear are connected to rotate integrally while being connected with the output member, and the third carrier is connected with the second electric motor. The engagement mechanism includes a fifth clutch mechanism selectively connecting the internal combustion engine with the first ring gear, and a ninth brake mechanism selectively halting the first and the third sun gears. In addition to above, there is provided a tenth brake mechanism selectively halting the first ring gear.

In addition, according to the present invention, the engagement mechanism includes a connecting mechanism selectively connecting the internal combustion engine with the input element, and brake mechanism. The transmission includes the input element, a rotary element connected with the second electric motor, another rotary element connected with the output member, and still another rotary element selectively halted by the brake mechanism. The hybrid drive unit of the present invention further comprises a means for carrying out a synchronous control of the connecting mechanism by releasing the brake mechanism while controlling a speed of the input element by the second electric motor, in case the speed of the first electric motor cannot be controlled when connecting the internal combustion engine with the input element by the connecting mechanism.

According to the present invention, therefore, the internal combustion engine and the output member are connected mechanically and a speed change ratio therebetween is set to the overdrive ratio, by connecting the internal combustion engine the output thereof is distributed to the first electric motor and to the output member with a predetermined input element of the transmission by the engagement mechanism, and by setting the speed change ratio of the transmission to the overdrive ratio. That is, the transmission serves as a speed change mechanism for the second electric motor, and also serves as an overdrive mechanism between the internal combustion engine and the output member. Thus, it is unnecessary to arrange a gear mechanism for relatively lowering a speed of the internal combustion engine in case a speed of the output member is high. For this reason, the hybrid drive unit can be downsized entirely by reducing number of components.

As explained above, according to the present invention, only the connection member is situated outer circumferential side of the planetary gear mechanisms constituting the transmission. That is, it is possible to cut down the factors of increasing an external diameter of the transmission so that the external diameter the hybrid drive unit can be reduced. Therefore, the hybrid drive unit of the present invention can be mounted easily on a front engine rear drive vehicle in which the transmission is arranged coaxially with the rotational axis of the engine.

In addition to the above-explained advantage, according to the present invention, a number of shafts arranged to be connected can be reduced. Therefore, an inner diameter of the first planetary gear mechanism can be minimized.

Moreover, according to the present invention, the fifth brake mechanism to be engaged to set the overdrive ratio and the rotary elements halted by the fifth brake mechanism can be arranged close together in the axial direction. In addition, a differential speed of the pinion gear of the first planetary gear mechanism can be lowered relatively when the second electric motor is driven at high speed.

In addition to the above-explained advantage, according to the present invention, the seventh brake mechanism and the second planetary gear mechanism are arranged adjacently in the radial direction. Therefore, number of the components to be arranged on the axial direction can be reduced. For this reason, the axial length of the hybrid drive unit can be shortened, and the external diameter of the second planetary gear mechanism can be reduced.

Further, as explained above, the transmission for the second electric motor also serves as an overdrive mechanism between the internal combustion engine and the output member. Therefore, it is unnecessary to arrange a gear mechanism for relatively lowering a speed of the internal combustion engine in case a speed of the output member is high. For this reason, the hybrid drive unit can be downsized entirely by reducing number of components.

Furthermore, the connecting mechanism can be synchronized by the second electric motor even in case the connecting mechanism cannot be synchronized by the first electric motor. Therefore, shocks resulting from alteration in the drive mode by engaging or releasing the connecting mechanism can be minimized.

BEST MODE FOR CARRYING OUT THE INVENTION

Figure 1:
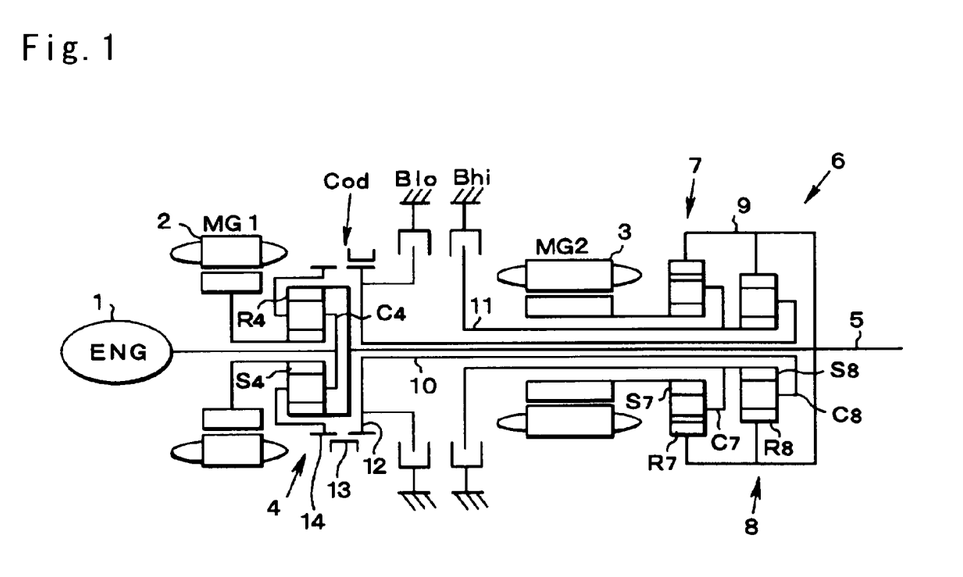
FIG. 1 is a skeleton diagram schematically showing one example of the hybrid drive unit of the invention.

Next, this invention will be described in connection with its specific examples. FIG. 1 shows a first example of the present invention. As shown in FIG. 1, an internal combustion engine (or an engine: ENG) 1, and two sets of electric motors 2 and 3 are provided as power units. The internal combustion engine 1 is a power unit for outputting power by combusting fuel, such as a gasoline engine, a diesel engine, a natural gas engine etc. Preferably, an opening degree of a throttle of the internal combustion engine 1 is electrically controllable, and an optimum driving point where the fuel economy of the engine 1 is optimum can be set by controlling speed thereof with respect to a load according to the opening degree of the throttle. In the following explanation, the internal combustion engine 1 will be called as the "engine 1".

On the other hand, the electric motors 2 and 3 serve as power units capable of functioning as at least any of an electric motor and a generator, or capable of functioning as both of an electric motor and a generator. For example, a motor generator (MG1, MG2) such as a permanent magnetic type synchronous motor can be used as the electric motors 2 and 3. The motor generators 2 and 3 are connected with an electric storage device (not shown) such as a battery through a controller (not shown) for controlling a generating amount, an output torque etc. of the motor generators 2 and 3. Also, the motor generators 2 and 3 are connected with each other so that electric power can be exchanged therebetween. Here, a first motor generator (MG1) 2 functions mainly as a generator, and a second motor generator (MG2) 3 functions mainly as a motor.

The engine 1 and the first motor generator 2 are connected with a power distribution mechanism 4 so as to distribute a power outputted from the engine 1 to the first motor generator 2 and to an output member. The power distribution mechanism 4 comprises at least three rotary elements such as a rotary element to which the engine 1 is connected, a rotary element to which the first motor generator 2 is connected, and a rotary element to which the output member is connected. That is, the power distribution mechanism 4 is a mechanism for performing a differential action using those rotary elements. For example, a planetary gear mechanism can be used as the power distribution mechanism 4. Specifically, both single pinion type and double pinion type planetary gear mechanisms can be used as the power distribution mechanism 4. In the example shown in FIG. 1, a single pinion type planetary gear mechanism is employed as the power distribution mechanism 4.

More specifically, the power distribution mechanism 4 comprises a sun gear S4 as an external gear, a ring gear R4 as an internal gear arranged concentrically with the sun gear S4, and a carrier C4 holding a pinion gear meshing with the sun gear S4 and the ring gear R4 in a rotatable and revolvable manner. The engine 1 is connected with the carrier C4, and a damper, a clutch or a torque converter having a lock-up clutch or the like may be interposed therebetween. The first motor generator 2 is connected with the sun gear S4, and the output member is connected with the ring gear R4. The output member is a member to which a torque from an output element of the power distribution mechanism 4 is transmitted, and in the example shown in FIG. 1, an output shaft 5 arranged coaxially with a center axis of the power distribution mechanism 4 functions as the output member. Thus, the power distribution mechanism 4 varies the speed of the engine 1 according to a change in the speed of the first motor generator 2 by a differential action. Since the speed of the engine 1 is thus varied, the power distribution mechanism 4 also serves as a continuously variable transmission (CVT).

In order to apply a power and a regenerative braking force to the output shaft 5, there is provided a second motor generator 3, and a transmission 6 is arranged between the second motor generator 3 and the output shaft 5. Specifically, the second motor generator 3 is arranged coaxially with the output shaft 5 on the opposite side of the engine 1 side (i.e., on the output shaft 5 side) across the power distribution mechanism 4. In addition, the second motor generator 3 is so-called "low torque-high speed type" motor generator, and an outer diameter thereof is smaller than that of the first motor generator 2.

The transmission 6 comprises two sets of planetary gear mechanisms. Specifically, according to the example shown in FIG. 1, the transmission 6 comprises a double pinion type first planetary gear mechanism 7, and a single pinion type second planetary gear mechanism 8. The first planetary gear mechanism 7 comprises following rotary elements, such as: a sun gear S7 as an external gear; a ring gear R7 as an internal gear arranged concentrically with the sun gear S7; and a carrier C7 holding a pinion gear meshing with the sun gear S7 and another pinion gear meshing with the pinion gear and the ring gear R7, in a rotatable and revolvable manner. On the other hand, the second planetary gear mechanism 8 comprises following rotary elements, such as: a sun gear S8 as an external gear; a ring gear R8 as an internal gear arranged concentrically with the sun gear S8; and a carrier C8 holding a pinion gear meshing with the sun gear S8 and the ring gear R8 in a rotatable and revolvable manner.

Those planetary gear mechanisms 7 and 8 are arranged in tandem coaxially with the output shaft 5. A cylindrical connection member 9 is arranged around outer circumference of the planetary gear mechanisms 7 and 8 thereby connecting the ring gears R7 and R8 of the planetary gear mechanisms 7 and 8 with each other, and also connecting those ring gears R7 and R8 with the output shaft 5. That is, according to the example shown in FIG. 1, only the connection member 9 is arranged around the outer circumference of the planetary gear mechanisms 7 and 8, in other words, around the transmission 6. For this reason, an outer diameter of this portion of the hybrid drive unit can be reduced so that the hybrid drive unit can be downsized.

The carrier C7 of the first planetary gear mechanism 7 and the sun gear S8 of the second planetary gear mechanism 8 are connected to rotate integrally. The planetary gear mechanisms 7 and 8 are thus combined to form the transmission 6 by connecting the ring gears R7 and R8, and connecting the carrier C7 and the sun gear S8. Therefore, the transmission 6 is capable of setting a low speed stage and a high speed stage where a speed change ratio is smaller than that of the low speed stage by selectively halting predetermined rotary elements thereof. For this purpose, the hybrid drive unit is provided with a brake Blo for setting the low speed stage by selectively halting the carrier C8 of the second planetary gear mechanism 8, and a brake Bhi for setting the high speed stage by selectively halting the carrier C7 of the first planetary gear mechanism 7 and the sun gear S8 of the second planetary gear mechanism 8. Here, the brake Bhi for setting the high speed stage corresponds to the brake mechanism of the present invention.

Specifically, a wet multiple disc clutch, a band brake, a dog clutch etc. may be used as the brakes Blo and Bhi, and the wet multiple disc clutch is used as the brakes Blo and Bhi in the example shown in FIG. 1. As shown in FIG. 1, the brakes Blo and Bhi are arranged between the power distribution mechanism 4 and the second motor generator 3, in the order of the brake Blo to the brake Bhi from the power distribution mechanism 4 side. That is, the brake Blo and the carrier C8 of the second planetary gear mechanism 8 are connected through a first hollow shaft arranged concentrically with the output shaft 5, and the brake Bhi is connected with the carrier C7 of the first planetary gear mechanism 7 and the sun gear S8 of the second planetary gear mechanism 8 through a second hollow shaft 11 arranged around an outer circumference of the first hollow shaft 10.

In addition to above, there is provided an overdrive clutch Cod for setting a speed change ratio between the engine 1 and the output shaft 5 to an overdrive ratio (O/D ratio) where the speed change ratio therebetween is smaller than "1", by connecting the engine 1 with a predetermined input element of the transmission 6. A role of the overdrive clutch Cod is to transmit a power outputted from the engine 1 to a fixing element for setting the low speed stage of the transmission 6, and a dog clutch, a frictional clutch or the like can be used as the overdrive clutch Cod. In the example shown in FIG. 1, a dog clutch is used as the overdrive clutch Cod, and a sleeve 13 thereof is splined on an outer circumference of a hub 12 thereof integrated with the first hollow shaft 10. Meanwhile, an input side hub 14, which is integrated with the carrier C4 of the power distribution mechanism 4, is situated adjacent to the hub 12 in the axial direction. Here, the overdrive clutch Cod corresponds to the connecting mechanism of the present invention.

That is, the overdrive clutch Cod is adapted to connect the carrier C4 with the first hollow shaft 10, i.e., to connect the engine 1 with the carrier C8 of the second planetary gear mechanism 8 by moving the sleeve 13 to the left side in FIG. 1 to engage the sleeve 13 with the hubs 12 and 14, and disconnects the engine 1 and the carrier C8 by moving the sleeve 13 to the right side in FIG. 1 to isolate the sleeve 13 from the hub 14. Accordingly, in case the overdrive clutch Cod disconnects the engine 1 and the carrier C8, a drag torque will not be generated so that a power loss can be minimized. Additionally, the sleeve 13 may be moved in its anteroposterior direction not only by a manual means but also by a hydraulic actuator or an electric actuator.

Figure 2:
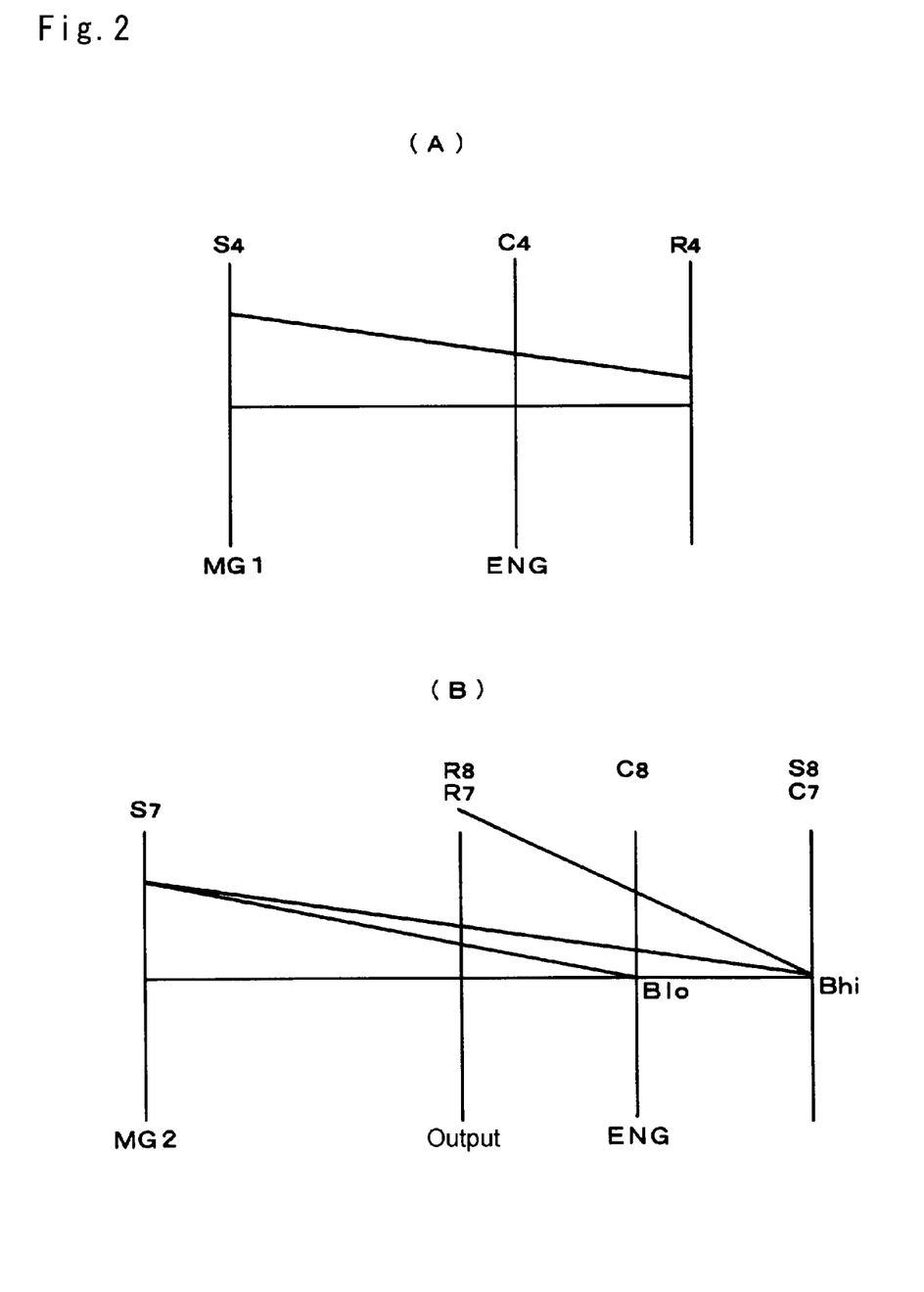
FIG. 2 is a nomographic diagram explaining operating states of the power distributing mechanism and the transmission.

Next, here will be explained an action of the hybrid drive unit shown in FIG. 1. Under the normal mode where the overdrive clutch Cod is being released, the power of the engine 1 is inputted to the carrier C4 of the power distribution mechanism 4, and on the other hand, a reaction torque established by the first motor generator 2 is acted on the sun gear S4. In this case, if the first motor generator 2 is rotated in the forward direction (i.e., in the same direction as a rotational direction of the engine 1), the first motor generator 2 functions as a generator. FIG. 2(A) is a nomographic diagram of the power distribution mechanism 4 indicating the above-explained situation. To the contrary, if the first motor generator 2 is rotated in the backward direction (i.e., in the direction opposite to the rotational direction of the engine 1), the first motor generator 2 functions as a motor. Thus, the reaction torque inputted to the sun gear S4 and the torque of the engine 1 are synthesized, and the synthesized torque is outputted from the ring gear R4 to the output shaft 5.

As explained above, the power distribution mechanism 4 is composed mainly of a planetary gear mechanism capable of performing a differential action. In this case, therefore, the speed of the engine 1 is varied according to a change in the speed of the first motor generator 2. Thus, the power distribution mechanism 4 is capable of functioning as a continuously variable transmission (CVT).

In case of using the first motor generator 2 as a generator, generated power is supplied to the second motor generator 3 to drive the second motor generator 3 as a motor. The power outputted from the second motor generator 3 is transmitted to the output shaft 5 through the transmission 6, and a torque of the second motor generator 3 is amplified according to the speed change ratio of the transmission 6. FIG. 2(B) is a nomographic diagram of the transmission 6. As indicated in FIG. 2(B), in case the carrier C8 of the second planetary gear mechanism 8 is being halted by engaging the brake Blo, the speed change ratio of the transmission 6 is increased relatively, and the torque of the second motor generator 3 is transmitted to the output shaft 5 while being amplified. On the other hand, in case the carrier C7 of the first planetary gear mechanism 7 and the sun gear S8 of the second planetary gear mechanism 8 are being halted by engaging the brake Bhi instead of the brake Blo, the speed change ratio of the transmission 6 is decreased relatively and an amplification of the output torque of the second motor generator 3 is reduced, as also indicated in FIG. 2(B).

Thus, under the normal mode, part of the power outputted from the engine 1 is transmitted to the output shaft 5 through the power distribution mechanism 4, and remaining power of the engine 1 is transmitted to the output shaft 5 while being converted into an electric power through the motor generators 2 and 3. That is, the power of the engine 1 is transmitted to the output shaft 5 not only mechanically but also electrically. In addition, the speed of the engine 1 can be varied continuously by the first motor generator 2. Therefore, the engine 1 can be driven at the driving point where fuel economy is optimum.

Figure 3:
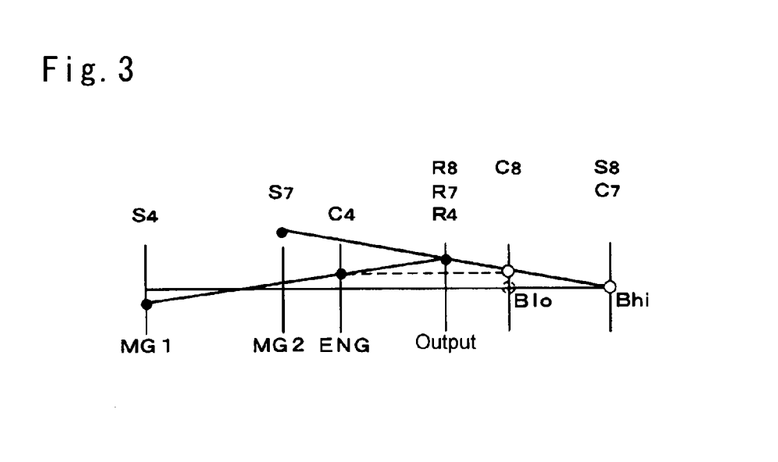
FIG. 3 is a nomographic diagram indicating a synchronous state of the overdrive clutch.

Moreover, the hybrid drive unit shown in FIG. 1 is capable of fixing the driving mode thereof to the overdrive mode (OD mode), in which the speed of the output shaft 5 is higher than that of the engine 1 and the power is transmitted mechanically. The overdrive mode can be set by connecting the engine 1 and the carrier C8 of the second planetary gear mechanism 8 by engaging the overdrive clutch Cod, and by halting the carrier C7 of the first planetary gear mechanism 7 and the sun gear S8 of the second planetary gear mechanism 8 by engaging the brake Bhi. FIG. 3 is a combined nomographic diagram indicating situations of the power distribution mechanism 4 and the transmission 6 under the overdrive mode. Here, the overdrive clutch Cod and the brake Bhi for setting the high speed stage correspond to the engagement mechanism of the invention, the brake Bhi corresponds to the first brake mechanism of the invention, the brake Blo for setting the low speed stage corresponds to the second brake mechanism of the invention, and the overdrive clutch Cod corresponds to the first clutch mechanism of the invention.

As indicated in FIG. 3, the speed of the engine 1 is governed by the speeds of the output shaft 5 and the first motor generator 2 under the overdrive mode, and the power of the engine 1 is inputted directly to the carrier C8 of the second planetary gear mechanism 8. In this situation, the sun gear S8 of the second planetary gear mechanism 8 is halted by the brake Bhi. Therefore, the ring gear R8 is rotated at higher speed than that of the carrier C8, and the overdrive mode is thereby set. That is, the output shaft 5 is rotated at higher speed than that of the engine 1. Therefore, in case the vehicle having the hybrid drive unit as thus far explained is running at high speed with low load, the fuel economy of the vehicle can be improved by setting the overdrive mode to lower the speed of the engine 1 relatively. In addition, the power can be transmitted mechanically to the output shaft 5 without being converted into electric power, that is, power loss can be minimized. For this reason, the fuel economy can be further improved.

In order to avoid abrupt fluctuation of the rotational speed resulting from engaging or releasing the overdrive clutch Cod, it is preferable to carry out a synchronous control. Specifically, it is preferable to synchronize the speed of the hub 12 with the speed of the hub 14, that is, to synchronize the speed of the engine 1 with the speed of the carrier C8 of the second planetary gear mechanism 8 by carrying out the synchronous control. As explained above, the speed of the engine 1 can be controlled by the first motor generator 2. Therefore, as indicated in FIG. 3, the speed of the first motor generator 2 is controlled to synchronize or approximate the speed of the engine 1 with the speed of the carrier C8 of the second planetary gear mechanism 8. If the synchronous control is thus carried out, shocks resulting from a shifting operation of the drive mode between the overdrive mode and the normal mode by engaging or releasing the overdrive clutch Cod can be minimized.

Next, here will be explained another example of the present invention with reference to FIG. 4. As can be seen from the example shown in FIG. 4, a structure of the transmission 6 is altered. Specifically, the sun gear S8 of the second planetary gear mechanism 8 is connected with the sun gear S7 of the first planetary gear mechanism 7 instead of the carrier C7, and the second motor generator 3 is connected with the carrier C7 of the first planetary gear mechanism 7. The remaining configurations of the hybrid drive unit are identical to that of the example shown in FIG. 1, so further explanation about the remaining elements will be omitted by allotting common reference numerals.

Figure 4:
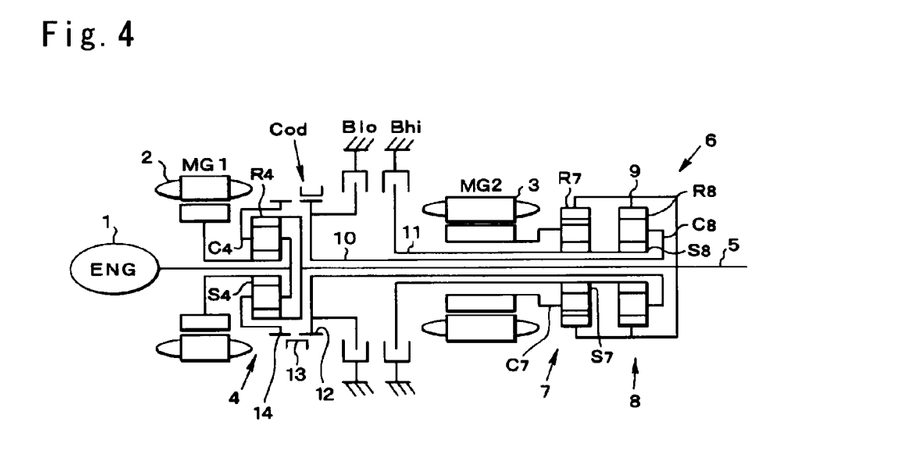
FIG. 4 is a skeleton diagram schematically showing another example of the hybrid drive unit of the invention.

According to the configuration shown in FIG. 4, the sun gear S7 of the first planetary gear mechanism 7 is connected with the second hollow shaft 11 so that the sun gears S7 and S8 share the common axis. As a result, a diameter of the second hollow shaft 11 is reduced relatively so that the transmission 6 is downsized. Here, according to the example shown in FIG. 4, the brake Bhi for setting the high speed stage corresponds to the third brake mechanism of the invention, the brake Blo for setting the low speed stage corresponds to the fourth brake mechanism of the invention, the overdrive clutch Cod corresponds to the second clutch mechanism of the invention, and the overdrive clutch Cod and the brake Bhi correspond to the engagement mechanism of the invention.

Figure 5:
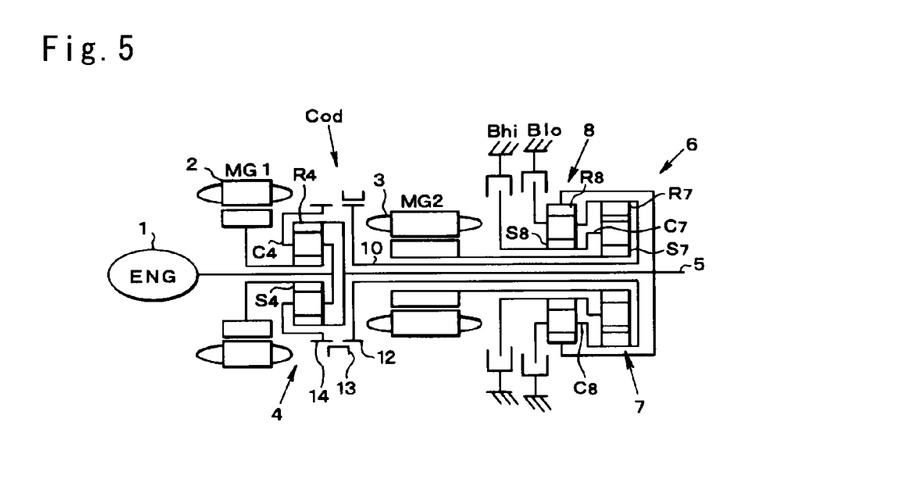
FIG. 5 is a skeleton diagram schematically showing still another example of the hybrid drive unit of the invention.

FIG. 5 shows still another example of the hybrid drive unit of the invention. In comparison with the examples of FIGS. 1 and 4, according to the example shown in FIG. 5, positions of the first planetary gear mechanism 7 and the second planetary gear mechanism 8 constituting the transmission 6 are switched in the axial direction, and positions of the brakes Blo and Bhi are altered in the axial direction. That is, the brake Bhi for setting the high speed stage and the brake Blo for setting the low speed stage are arranged in order between the second motor generator 3 and the transmission 6.

Specifically, in the transmission 6, the second planetary gear mechanism 8 is situated on the second motor generator 3 side (i.e., on the engine 1 side), and the first planetary gear mechanism 7 is situated on an opposite side. The ring gear R8 of the second planetary gear mechanism 8 is connected with the output shaft 5. The ring gear R7 of the first planetary gear mechanism 7 and the carrier C8 of the second planetary gear mechanism 8 are connected to rotate integrally. Those ring gear R7 and the carrier C8 are connected with the overdrive clutch Cod and with the brake Blo. The carrier C7 of the first planetary gear mechanism 7 and the sun gear S8 of the second planetary gear mechanism 8 are connected to rotate integrally, and those carrier C7 and the sun gear S8 are connected with the brake Bhi. The remaining configuration is identical to those of the examples shown in FIGS. 1 and 4, so further explanation about the remaining elements will be omitted by allotting common reference numerals.

According to the example shown in FIG. 5, the overdrive clutch Cod corresponds to the third clutch mechanism of the invention, the brake Bhi for setting the high speed stage corresponds to the fifth brake mechanism of the invention, and the brake Blo for setting the low speed stage corresponds to the sixth brake mechanism of the invention. The overdrive clutch Cod and the brake Bhi correspond to the engagement mechanism of the invention.

As the example of FIGS. 1 and 4, the hybrid drive unit shown in FIG. 5 is also capable of setting the overdrive mode using the transmission 6. That is, the overdrive mode can be set using minimum number of the planetary gear mechanism. Therefore, the hybrid drive unit can be downsized so that the hybrid drive unit can be mounted on the vehicle easily. Moreover, since the second motor generator 3 is situated on the engine 1 side, an outer diameter of the hybrid drive unit on the opposite side of the engine 1 side can be reduced. Therefore, the hybrid drive unit can be mounted easily even on a vehicle in which an interior space is limited by a configuration of a floor such as a front engine rear drive vehicle. Further, since the brakes Bhi and Blo are arranged close to the planetary gear mechanisms 7 and 8, lengths of shafts (or arms) connecting the brakes Bhi and Blo with the rotary elements to he halted by the brakes Bhi and Blo can be shortened.

Figure 6:
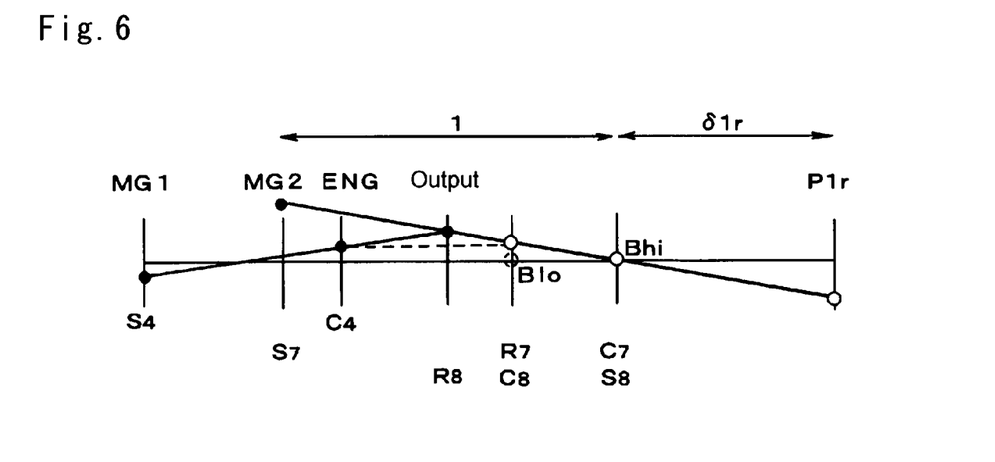
FIG. 6 is a nomographic diagram indicating a synchronous state of the overdrive clutch shown in FIG. 5.

FIG. 6 is a nomographic diagram indicating a synchronous state of the overdrive clutch shown in FIG. 5. In FIG. 6, δ 1r is a ratio between a number of teeth of the sun gear S7 and a number of teeth of an inner pinion (teeth number of sun gear/teeth number of inner pinion). Here, P1r represents the inner pinion on the nomographic diagram. As can be seen from FIG. 6, δ 1r can be reduced according to the example of FIG. 5. Therefore, a differential speed of the pinion gears, that is, a difference between the rotational speed of the inner pinion and the rotational speed of the carrier can be kept within an allowable range even if the second motor generator 3 is driven at the highest speed. For this reason, deterioration in durability of the planetary gear mechanisms 7 and 8, i.e., deterioration in durability of the transmission 6 can be minimized. In other words, endurance of the transmission 6 can be improved.

Figure 7:
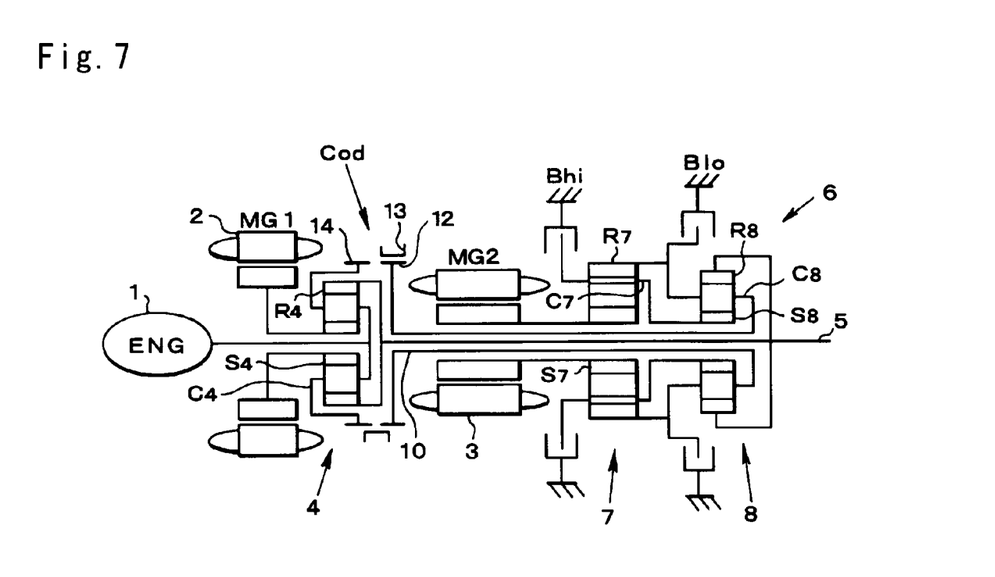
FIG. 7 is a skeleton diagram schematically showing further example of the hybrid drive unit of the invention.

FIG. 7 shows an alternative of the example shown in FIG. 5 wherein an arrangement is altered to shorten the total length of the hybrid drive unit. According to the example shown in FIG. 7, positions of the first planetary gear mechanism 7 and the second planetary gear mechanism 8 constituting the transmission 6 are switched in the axial direction. As a result of such alteration, the brake Blo for setting the low speed stage is arranged on an outer circumferential side of the second planetary gear mechanism 8, which is arranged on the opposite side of the second motor generator 3 across the first planetary gear mechanism 7. The remaining configuration including connections among the rotary elements and the rotary members is identical to that of the example shown in FIG. 5, so further explanation about the remaining elements will be omitted by allotting common reference numerals. Here, according to the example shown in FIG. 7, the overdrive clutch Cod corresponds to the fourth clutch mechanism of the invention, the brake Blo for setting the low speed stage corresponds to the seventh brake mechanism, the brake Bhi for setting the high speed stage corresponds to the eighth brake mechanism, and the overdrive clutch Cod and the brake Bhi correspond to the engagement mechanism of the invention.

According to the example shown in FIG. 7, therefore, the aforementioned advantages achieved by the example of FIG. 5 can also be achieved by the example of FIG. 7. In addition, since the brake Blo for setting the low speed stage is displaced in the radial direction to be situated outer circumferential side of the second planetary gear mechanism 8, a number of elements arranged in the axial direction is reduced. Therefore, a total length of the hybrid drive unit can be shortened.

Figure 8:
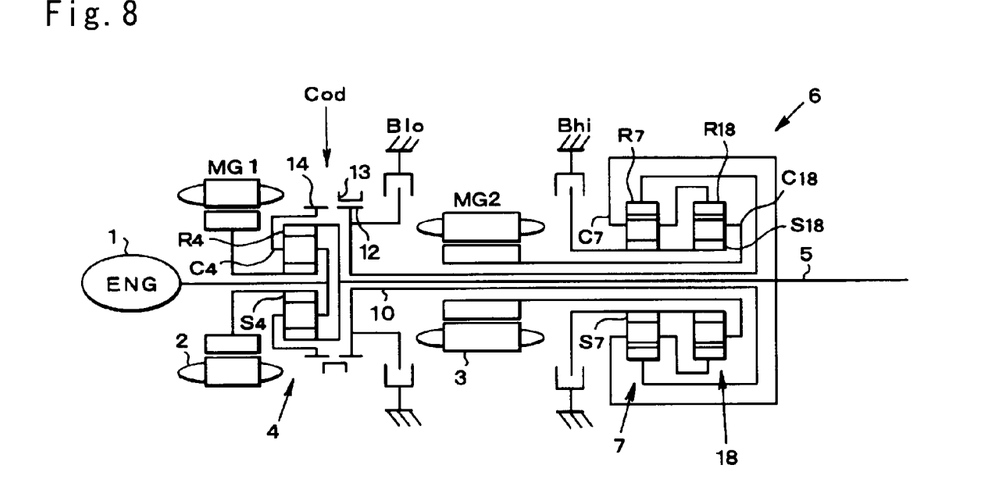
FIG. 8 is a skeleton diagram schematically showing still further example of the hybrid drive unit of the invention.

As shown in FIG. 8, according to the present invention, the transmission 6 may also be formed using two sets of double pinion type planetary gear mechanisms. As can be seen from the example shown in FIG. 8, two sets of double pinion type planetary gear mechanisms are arrange in tandem in the axial direction around the output shaft 5. Hereinafter, the planetary gear mechanism arranged on the second motor generator 3 side will be called as a first planetary gear mechanism 7, and the planetary gear mechanism of other side will be called tentatively as a third planetary gear mechanism 18.

Likewise the first planetary gear mechanism 7, the third planetary gear mechanism 18 also comprises the following rotary elements such as, a sun gear S18 as an external gear, a ring gear R18 as an internal gear arranged concentrically with the sun gear S18, and a carrier C18 holding a pinion gear meshing with the sun gear S18 and another pinion gear meshing with said pinion gear and the ring gear R 18 in a rotatable and revolvable manner.

According to the example shown in FIG. 8, the carrier C7 of the first planetary gear mechanism 7 and the ring gear R18 of the third planetary gear mechanism 18 are connected to rotate integrally, and those carrier C7 and the ring gear R18 are connected with the output shaft 5. The sun gears S7 and S18 are connected to share the common axis, and those sun gears S7 and S18 are connected with the brake Bhi for setting the high speed stage. Here, the brake Bhi is arranged between the second motor generator 3 and the transmission 6. The ring gear R7 of the first planetary gear mechanism 7 is connected with the overdrive clutch Cod through the first hollow shaft 10. The remaining configuration of the hybrid drive unit is identical to that of the example shown in FIG. 1, so further explanation about the remaining elements will be omitted by allotting common reference numerals. According to the example shown in FIG. 8, the overdrive clutch Cod corresponds to the fifth clutch mechanism of the invention, the brake Bhi for setting the high speed stage corresponds to the ninth brake mechanism of the invention, the brake Blo for setting the low speed stage corresponds to the tenth brake mechanism of the invention, and the overdrive clutch Cod and the brake Bhi correspond to the engagement mechanism of the invention.

Likewise the examples of FIGS. 1, 4, 5 and 7, the example shown in FIG. 8 is also capable of setting the overdrive mode using the transmission 6. Therefore, the fuel economy of the vehicle can be improved in case the vehicle is running at high speed with low load, and the hybrid drive unit can be downsized so that the unit can be mounted on the vehicle easily.

In any of the examples thus far described, since the speed of the engine 1 can be controlled by the first motor generator 2, the speed control to synchronize the overdrive clutch Cod is carried out by the first motor generator 2. However, in case the temperature of the first motor generator 2 is too high, incase the output from the electric storage device is restricted, or in case some kind of condition of failure is satisfied, such synchronization control of the overdrive clutch Cod cannot be carried out by the first motor generator 2. In this case, the hybrid drive unit of the present invention carries out the following control.

Figure 9:
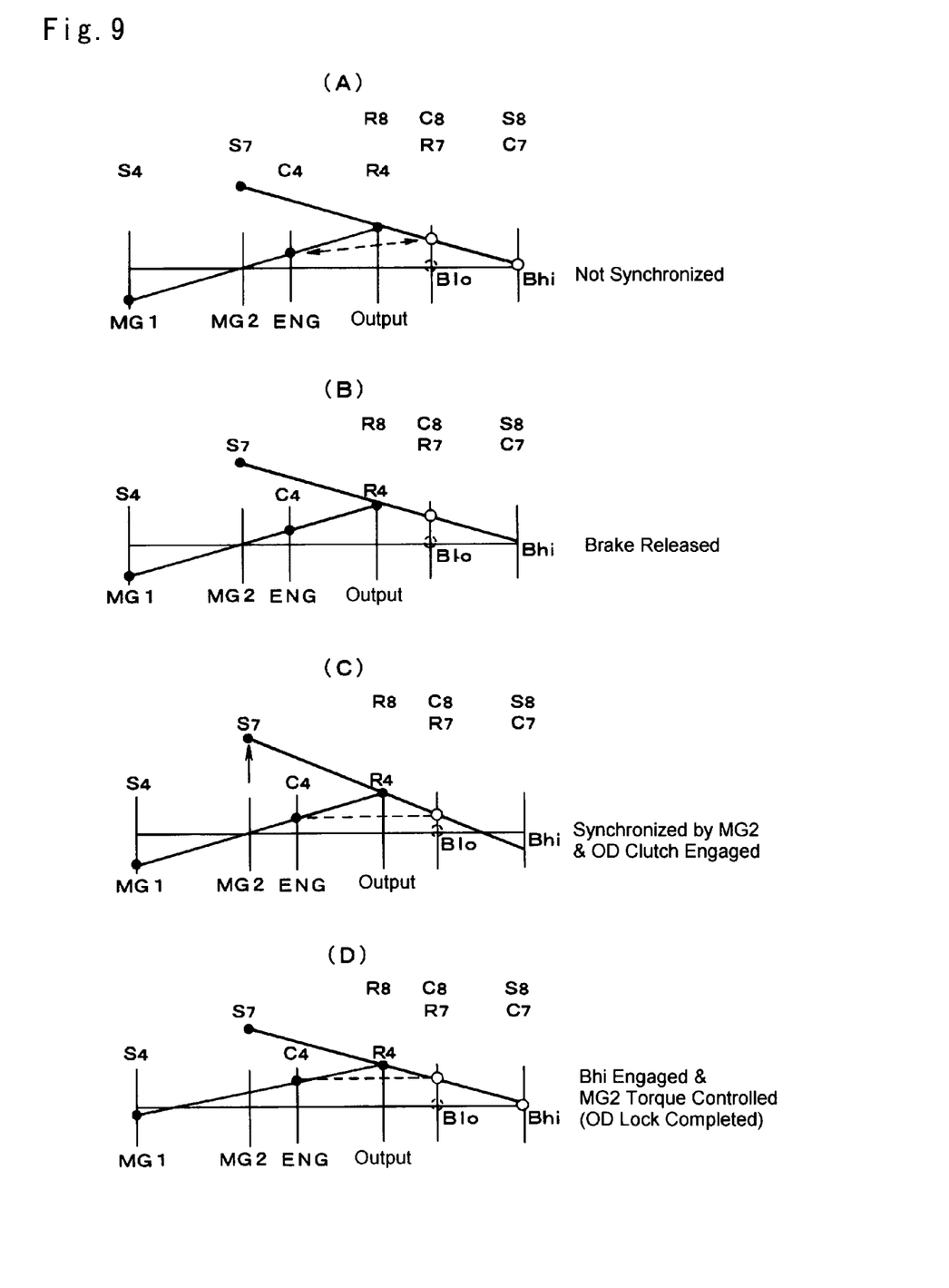
FIG. 9 is a nomographic diagram indicating operation states of the case in which a synchronous control of the overdrive clutch is carried out by the second motor generator instead of the first motor generator.

FIG. 9 is a nomographic diagram indicating change in operation states of the elements in case the synchronous control is carried out. FIG. 9(A) indicates a state where the transmission 6 is set to the high speed stage under the normal mode. For example, in case the hybrid drive unit shown in FIG. 7, the brake Bhi for setting the high speed stage is engaged to halt the carrier C7 of the first planetary gear mechanism 7 and the sun gear S8 of the second planetary gear mechanism 8 in this situation. Normally, the rotational speed of the engine 1 does not congruent with the rotational speeds of the ring gear R7 of the first planetary gear mechanism 7 and the carrier C8 of the second planetary gear mechanism 8, therefore, the overdrive clutch Cod itself is not being synchronized.

If the speed of the first motor generator 2 is out of control in this situation, the speed of the engine 1 cannot be varied by the first motor generator 2. Therefore, in order to synchronize the overdrive clutch Cod, the brake Bhi for setting the high speed stage is released first of all, and this situation is indicated in FIG. 9(B). As indicated in FIG. 9(B), the speed of the ring gear R7 of the first planetary gear mechanism 7 and the carrier C8 of the second planetary gear mechanism 8 integrated therewith thus can be varied by varying the speed of the second motor generator 3 and the sun gear S7 of the first planetary gear mechanism 7 connected therewith, while keeping the speed of the ring gear R8 of the second planetary gear mechanism 8 as the output element or the output shaft 5 connected therewith.

Then, as indicated in FIG. 9(C), the speed of the ring gear R7 of the first planetary gear mechanism 7 and the carrier C8 of the second planetary gear mechanism 8 integrated therewith is approximated to the speed of the engine 1 by varying the speed of the second motor generator 3. When the synchronization of the rotational speeds is achieved, that is, when the speeds of the hubs 12 and 14 of the overdrive clutch Cod are synchronized, or when the difference between the speeds of the hubs 12 and 14 becomes smaller than a predetermined value, the overdrive clutch Cod is engaged by moving the sleeve 13 to the left in FIG. 7. As a result, fluctuation in the rotational speed resulting from the engagement of the overdrive clutch Cod can be minimized so that shocks resulting from the engagement of the overdrive clutch Cod can be mitigated.

Subsequently, as indicated in FIG. 9(D), the speed of the second motor generator 3 is varied to adjust the speed of the integrated carrier C7 and sun gear S8 to be halted by the brake Bhi to zero. When the speed of the carrier C7 of the first planetary gear mechanism 7 and the sun gear S8 of the second planetary gear mechanism 8 integrated therewith becomes substantially zero, the brake Bhi for setting the high speed stage is engaged to set the overdrive mode. As a result, fluctuation in the rotational speed or in the torque resulting from the engagement of the overdrive clutch Cod or the brake Bhi can be minimized so that shocks resulting from the engagement of the overdrive clutch Cod or the brake Bhi can be mitigated. Lastly, the synchronous control thus far explained can be carried out by outputting a command signal from an electric control unit (not shown) to the aforementioned controller to control the rotational speed or torque of the motor generators 2 and 3, and to control an actuators of the brakes Bhi and Blo or the overdrive clutch Cod.

The invention claimed is:

1. A hybrid drive unit, comprising:
a power distribution mechanism for distributing a power outputted from an internal combustion engine to a first electric motor and to an output member;
a transmission, which is arranged between the output member and a second electric motor in a manner to transmit a torque therebetween, and which is capable of setting an overdrive ratio where a speed of an output element connected with the output member is higher than that of a predetermined input element;
a first power transmission route to transmit the torque from the internal combustion engine to the output member;
a second power transmission route to transmit the torque from the second electric motor to the output member, the second power transmission route arranged in parallel with the first power transmission route; and
an engagement mechanism for connecting the internal combustion engine selectively with the input element of the transmission in a manner such that the internal combustion engine and the input element of the transmission rotate integrally, and for setting a speed change ratio of the transmission to the overdrive ratio, wherein
the transmission comprises a first planetary gear mechanism and a second planetary gear mechanism, the first and second planetary gear mechanisms including rotary elements,
any of the rotary elements are connected with each other,
the first planetary gear mechanism is a double pinion type planetary gear mechanism comprising a first sun gear as an external gear, a first ring gear as an internal gear arranged concentrically with the first sun gear, and a first carrier holding a pinion gear meshing with the first sun gear and another pinion gear meshing with the pinion gear and the first ring gear,
the second planetary gear mechanism is a single pinion type planetary gear mechanism comprising a second sun gear as an external gear, a second ring gear as an internal gear arranged concentrically with the second sun gear, and a second carrier holding a pinion gear meshing with the second sun gear and the second ring gear,
the first planetary gear mechanism and the second planetary gear mechanism are arranged coaxially in tandem,
a connection member independently connecting the ring gears of the first and the second planetary gear mechanisms while connecting those ring gears with the output member, the connection member situated at an outer circumferential side of the first and the second planetary gear mechanisms,
the first carrier and the second sun gear are connected to rotate integrally, and the first sun gear is connected with the second electric motor,
the engagement mechanism includes a first clutch mechanism selectively connecting the second carrier with the internal combustion engine, and a first brake mechanism selectively halting the first carrier and the second sun gear, and
the hybrid drive unit further comprises a second brake selectively halting the second carrier.

2. The hybrid drive unit as claimed in claim 1, wherein the power distribution mechanism is bypassed when setting the speed change ratio of the transmission to the overdrive ratio.

* * * * *